US011413761B2

(12) United States Patent
Simkins (10) Patent No.: US 11,413,761 B2
(45) Date of Patent: Aug. 16, 2022

(54) MODULAR PLATFORM FOR ROBOTIC END EFFECTOR

(71) Applicant: ABB Schweiz AG, Baden (CH)

(72) Inventor: Matt Simkins, Redwood City, CA (US)

(73) Assignee: ABB Schweiz AG, Baden (CH)

( * ) Notice: Subject to any disclaimer, the term of this patent is extended or adjusted under 35 U.S.C. 154(b) by 564 days.

(21) Appl. No.: 15/991,834

(22) Filed: May 29, 2018

(65) Prior Publication Data
US 2019/0366553 A1    Dec. 5, 2019

(51) Int. Cl.
| B25J 15/04 | (2006.01) |
| B25J 9/16 | (2006.01) |
| B25J 19/02 | (2006.01) |
| B25J 15/00 | (2006.01) |
| B25J 9/08 | (2006.01) |
| B25J 19/00 | (2006.01) |

(52) U.S. Cl.
CPC ............... *B25J 9/1697* (2013.01); *B25J 9/08* (2013.01); *B25J 9/161* (2013.01); *B25J 15/0061* (2013.01); *B25J 15/0095* (2013.01); *B25J 15/04* (2013.01); *B25J 19/0025* (2013.01); *B25J 19/023* (2013.01); *G05B 2219/34205* (2013.01)

(58) Field of Classification Search
None
See application file for complete search history.

(56) References Cited

U.S. PATENT DOCUMENTS

| 4,512,709 A | 4/1985 | Hennekes et al. |
| 4,708,126 A * | 11/1987 | Toda ................. A61B 1/00124 600/132 |
| 4,717,003 A | 1/1988 | McCormick et al. |
| 4,784,421 A | 11/1988 | Alvite |
| 4,875,275 A | 10/1989 | Hutchinson et al. |
| 5,069,524 A * | 12/1991 | Watanabe ............ H01R 13/625 385/59 |
| 5,428,713 A * | 6/1995 | Matsumaru ............ B25J 9/1615 700/245 |
| 6,015,174 A | 1/2000 | Raes et al. |
| 6,297,611 B1 | 10/2001 | Todorov et al. |

(Continued)

FOREIGN PATENT DOCUMENTS

GB          886296 A  *  1/1962  ............. F04D 13/10

OTHER PUBLICATIONS

Patent Cooperation Treaty, International Search Report and Written Opinion in corresponding application No. PCT/US2019/033516, dated Aug. 2, 2019, 11 pp.

(Continued)

*Primary Examiner* — Michael S Lowe
(74) *Attorney, Agent, or Firm* — Leydig, Voit & Mayer, Ltd.

(57) ABSTRACT

The disclosed system includes a robot system with a robot having a modular platform and a controller operably coupled to the robot. The modular platform includes a plurality of mount connectors and a plurality of receiving port connectors. Each of the mount connectors is configured to attach to the robot and each of the receiving ports is configured to connect to an end effector such as a gripper, sensor or other tool. The modular platform is configured to mount to the robot in a plurality of orientations and to connect with a plurality of different end effectors.

24 Claims, 6 Drawing Sheets

(56) References Cited

U.S. PATENT DOCUMENTS

| | | | |
|---|---|---|---|
| 6,533,594 B1* | 3/2003 | Kurup | B23K 11/362 |
| | | | 439/191 |
| 8,453,533 B2* | 6/2013 | Ryland | B25J 9/06 |
| | | | 74/490.05 |
| 8,601,667 B2* | 12/2013 | Norton | B25J 15/04 |
| | | | 29/428 |
| 8,606,398 B2 | 12/2013 | Eakins et al. | |
| 8,992,113 B2 | 3/2015 | Campagna et al. | |
| 9,475,199 B2 | 10/2016 | Burridge et al. | |
| D783,695 S | 4/2017 | Ke et al. | |
| 9,616,580 B2 | 4/2017 | Smith et al. | |
| 9,656,394 B2 | 5/2017 | Lin et al. | |
| 9,757,863 B2 | 9/2017 | Suzuki | |
| 10,286,566 B2* | 5/2019 | Williams | B25J 19/0066 |
| 2006/0088367 A1* | 4/2006 | Dellach | B25J 15/0061 |
| | | | 403/31 |
| 2008/0260499 A1 | 10/2008 | van der Meulen | |
| 2012/0215358 A1 | 8/2012 | Gettings et al. | |
| 2013/0252461 A1* | 9/2013 | Gross | H01R 13/5227 |
| | | | 439/577 |
| 2013/0340560 A1 | 12/2013 | Burridge et al. | |
| 2016/0067868 A1 | 3/2016 | Porter et al. | |
| 2017/0120454 A1 | 5/2017 | Ferguson et al. | |
| 2017/0130880 A1* | 5/2017 | Kempf | F16L 23/003 |
| 2017/0190050 A1 | 7/2017 | Cookson et al. | |
| 2017/0352988 A1 | 12/2017 | Tsurimoto et al. | |

OTHER PUBLICATIONS

Jay Davey et al., ModLock: A Manual Connector for Reconfigurable Modular Robots, GRASP Lab and Department of Mechanical Engineering and Applied Mechanics, published in Intelligent Robots and Systems (IROS), 2012 IEEE/RSJ International Conference on Oct. 7-12, 2012, University of Pennsylvania, US (7 pages).

* cited by examiner

MODULAR PLATFORM FOR ROBOTIC END EFFECTOR

TECHNICAL FIELD

The present application generally relates to a modular platform for a robot, and more particularly, but not exclusively, to a modular platform for connecting a plurality of different end effectors to the robot.

BACKGROUND

An end effector is typically attached to an arm of a robot and is operable to enable the robot to perform one or more tasks in a robot work environment. A platform can be used to couple an end effector to the robot. An end effector can include a gripper; a tool such as a drill, screwdriver, hammer or the like; and/or a sensor such as a vision sensor, proximity sensor, acoustic sensor, temperature sensor, pressure sensor or other similar apparatus. Some existing systems have various shortcomings relative to certain applications. Accordingly, there remains a need for further contributions in this area of technology.

SUMMARY

One embodiment of the present application is a unique modular platform for attaching a plurality of different end effectors to a robot. Other embodiments include apparatuses, systems, devices, hardware, methods, and combinations for a universal modular platform operable to connect, transmit control signals and provide power to one or more of a plurality of different end effectors. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

Figure 1:
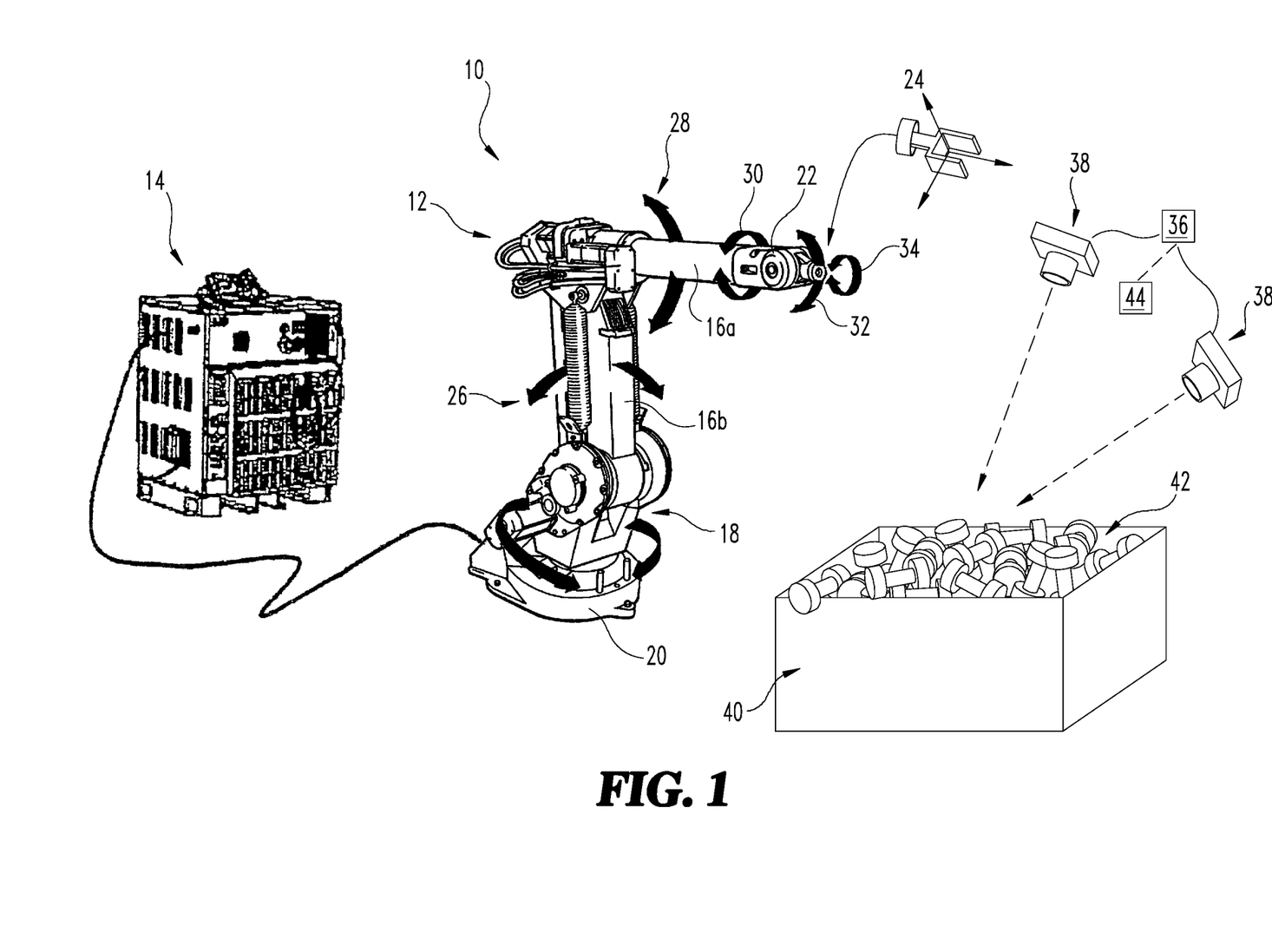
FIG. 1 is a schematic illustration of a robot system according to one exemplary embodiment of the present disclosure.

Referring now to FIG. 1, an exemplary robot system 10 is shown in an exemplary working environment or industrial scene. It should be understood that the robot system shown herein is exemplary in nature and that variations in the robot and/or industrial scene is contemplated herein. The robot system 10 can include a robot 12 with a vision system 36 having one or more cameras 38. In one form, one or more of the cameras 38 can be mounted on one of the moveable arms 16a, 16b of the robot 12. In other forms, one or more cameras 38 may be positioned apart from the robot 12. An electronic controller 14 includes a CPU, a memory, and input/output systems that are operably coupled to the robot 12 and to the vision system 36. The controller 14 is operable for receiving and analyzing images captured by the vision system and other sensor data used for operation of the robot 12.

The robot 12 may include a movable base 20 and a plurality of movable portions connected thereto. The movable portions may translate or rotate in any desired direction. By way of example and not limitation, movable portions illustrated by arrows 18, 26, 28, 30, 32 and 34 may be employed by the exemplary robot 12. A bin 40 for holding workpieces or other objects 42 to be retrieved and/or worked on by the robot 12 may constitute at least a part of the exemplary industrial scene. An end effector 24 such as a gripping or grasping mechanism, welding mechanism, painting mechanism, gluing mechanism or other tools can be attached to the moveable arm 16b and used to perform work tasks on the object 42 as desired. It should be understood that the term "bin" is exemplary in nature and as used herein means, without limitation, any container, carton, box, tray or other structure that can receive and/or hold workpieces, parts or other objects. Additional components 44 can be associated with the vision system. These components 44 can include lighting systems, reflector(s), refractor(s) and beam expander(s) or the like.

Figure 2:
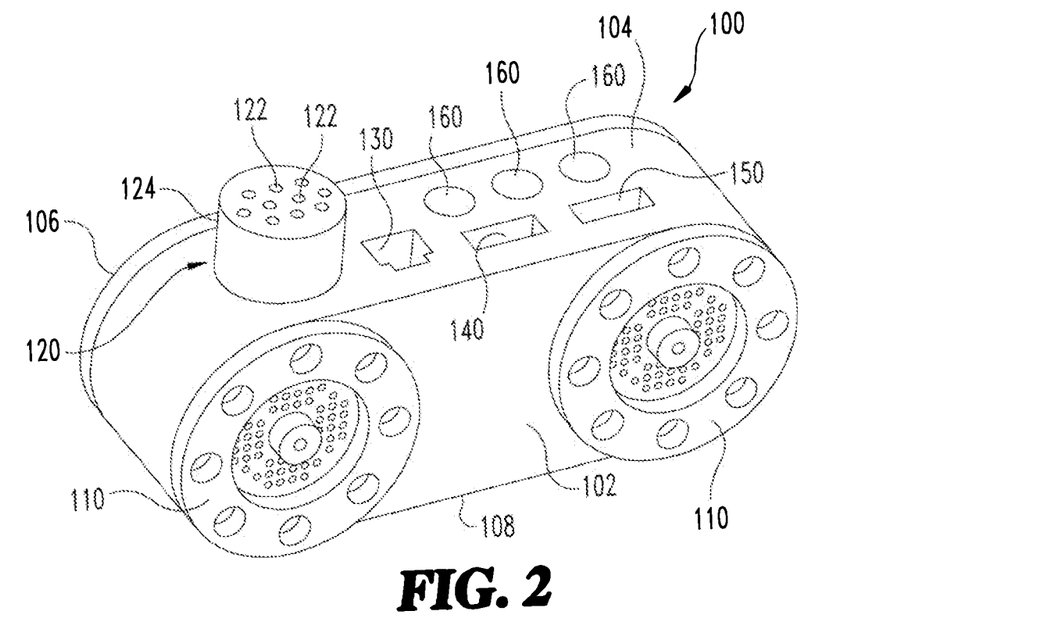
FIG. 2 is a perspective front view of a modular platform for an end effector according to one exemplary embodiment of the present disclosure.
Figure 3:
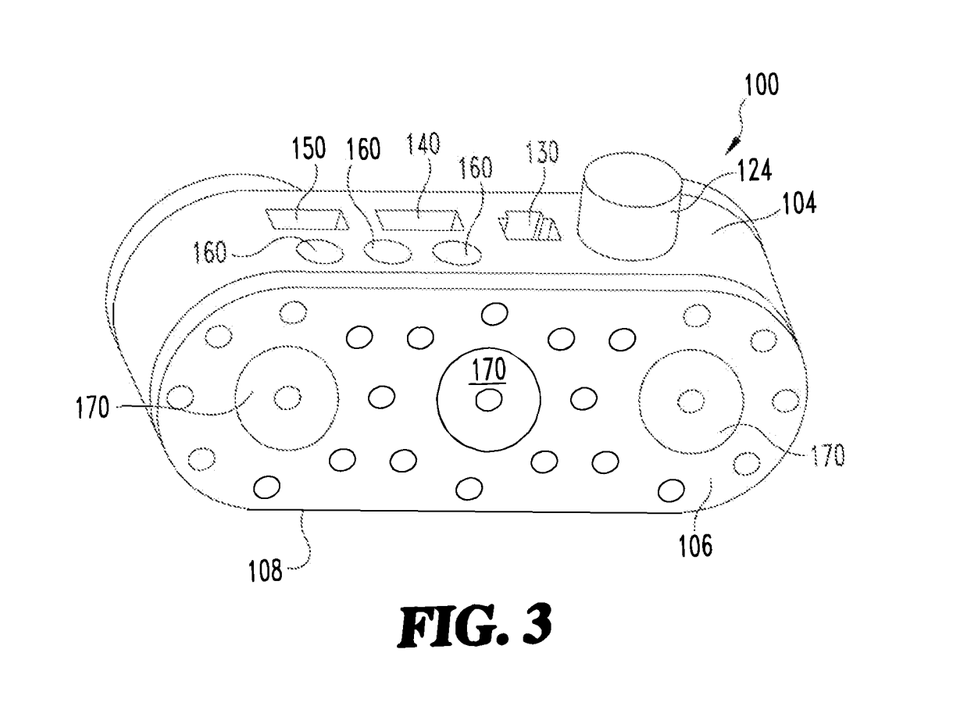
FIG. 3 is a perspective back view of the modular platform of FIG. 2.

Referring now to FIGS. 2 and 3, perspective views of a modular platform according to one embodiment of the present disclosure is illustrated. The modular platform 100 can include a first sidewall 102, a second sidewall 104, a third sidewall 106 and a fourth sidewall 108. In one form, the first sidewall 102 can be a front wall, the second sidewall 104 can be a top wall, the third sidewall 106 can be a back wall and the fourth sidewall 108 can be bottom wall. However it should be understood that the modular platform 100 may in a form other than that described in the exemplary embodiment of FIGS. 2 and 3. For example, the modular housing 100 may not have distinct flat walls, but on the contrary may have curved or arcuate walls in some embodiments.

The first sidewall 102 can include a receiving port 110, and in the exemplary form includes two receiving ports 110. In other embodiments, not shown, the modular platform 100 may include three or more receiving ports 110. Each receiving port can connect with an end effector 24 as will be described in further detail below. The modular platform 100 can include an electrical power socket 120 operable for receiving electrical power from a power source (not shown) and conducting the electrical power through one or more electrical conduits 122 within the modular platform 100. In one form, the electrical power socket 120 can be a protruding member configured as a cylindrically shaped boss as illustrated (for example, see reference numeral 124). However, it should be understood that other forms of an electrical sockets 120 are contemplated herein. The modular platform 100 can include one or more communication ports to receive and transmit communication signals between the control system 14, the robot and one or more end effectors 24. In the disclosed form, a first communication port 130 can be an Ethernet port or the like, a second communication port 140 can be a USB port and a third communication port 150 can be a different connection port such as a serial or parallel port. The communication ports 130, 140, 150 can transmit and receive communication signals to or from various apparatus such as, by way of example and not limitation, a controller, an internet cloud system, teach pendants or the like. Further, the communication may include wireless transmission to/from a smart phone, over Wi-Fi networks or other means as would be known to one skilled in the art. Other types of communication ports are contemplated by this disclosure. The modular platform 100 can also include one or more fluid ports 160 for receiving a working fluid to provide hydraulic power and/or pneumatic power or the like to an end effector 24 as is known to those skilled in the art. Referring more particularly to FIG. 3, the backside 106 can include multiple mount connectors 170 configured to be removably attach to the robot 12 (see FIG. 1). It should be understood that the various connection features described herein can be in locations other than that shown in the illustrative embodiment and in some cases may be redundant in different areas of the modular platform 100. For example, one or more mount connectors 170 may also be located on other sides 102, 104, 108 etc. of the modular platform 100. In one form, a mount connector 170 can attach to the arm 16 a of the robot 12.

Figure 4:
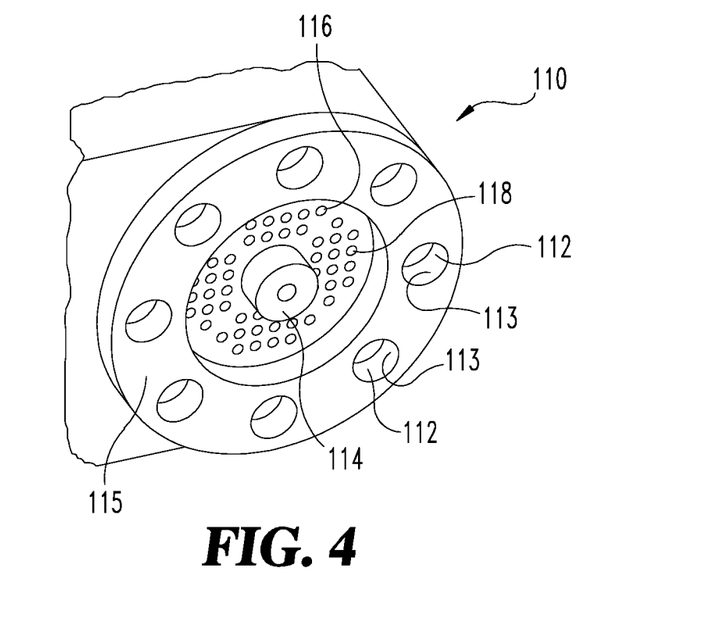
FIG. 4 is a perspective view of an enlarged portion of the modular platform of FIG. 2.

Referring now to FIG. 4, an enlarged view of the receiving port 110 is illustrated. The receiving port 110 can include one or more mounting apertures 112 that can include threaded features 113 to connect with an end effector 24. A threaded connecting element (not shown) formed with an end effector 24 (see FIG. 1) can be attached to one or more of the mounting apertures 112 of the receiving port 110. It should be noted that while the threaded features 113 are illustrated as having a recessed structure that in other forms the threaded features 113 may protrude from an outer surface 115 of the receiving port 110. Further, the skilled artisan will recognize that any of the mating features of the robot 12, end effector 24 and the modular platform 100 may have different forms than that shown in the exemplary embodiment. In addition, other mechanical connection means may be employed anywhere on the modular platform 100 such as by way of example and not limitation, pneumatic connectors with quick disconnect mechanisms or the like.

A fluid port 114 is formed with the receiving port 110 to operably couple with an end effector 24 to provide hydraulic fluid to actuate the end effector 24 while performing a robot work task. The receiving port 110 can also include an electrical power outlet 116 to transmit electrical power from the modular platform 100 to an end effector 24. The receiving port 110 can also include communication outlet ports 118 operable to connect with the end effector 24 or other features of the robot 12.

Figure 5:
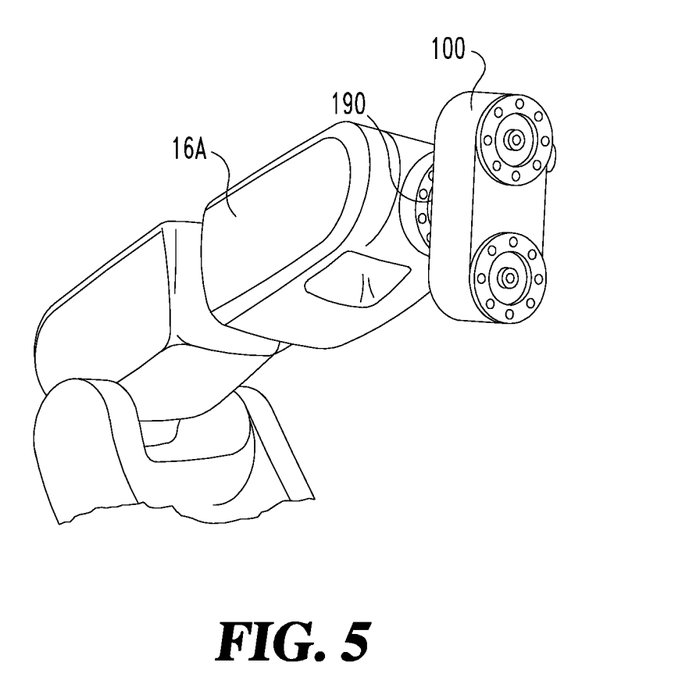
FIG. 5 is a perspective view of a portion of a robot having the modular platform attached thereto in a first position.
Figure 6:
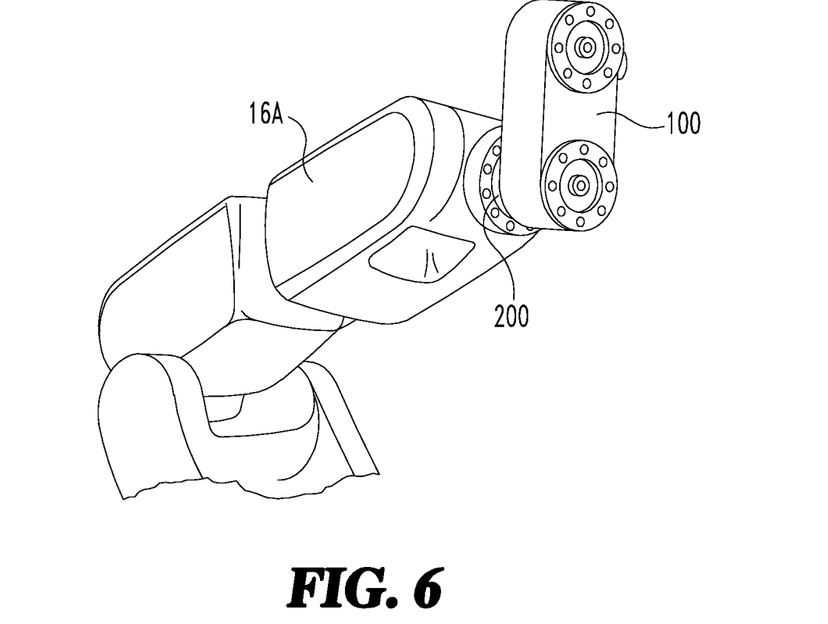
FIG. 6 is a perspective view of a portion of a robot having the modular platform attached thereto in another position.
Figure 7:
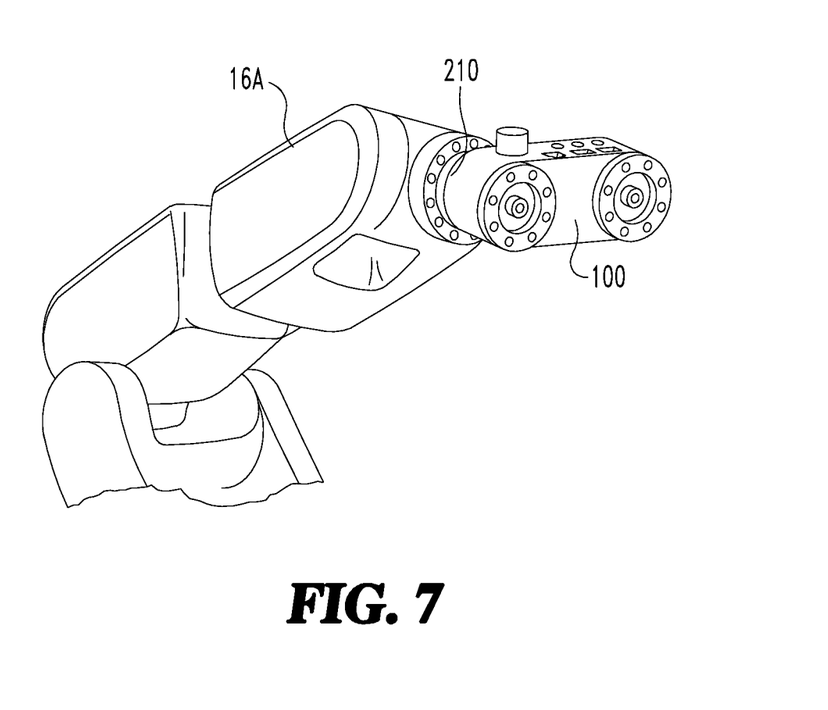
FIG. 7 is a perspective view of a portion of a robot having the modular platform attached thereto in another position.
Figure 8:
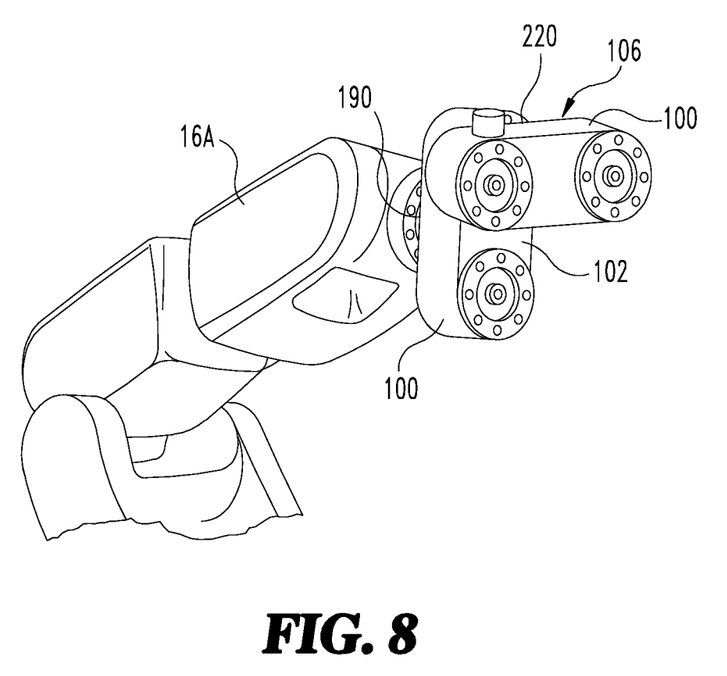
FIG. 8 is a perspective view of a portion of a robot having multiple modular platforms attached thereto in one configuration.
Figure 9:
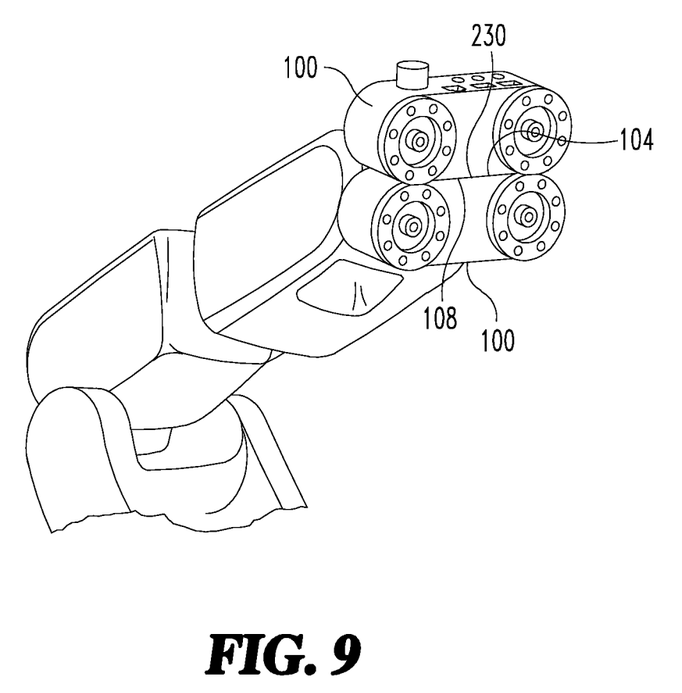
FIG. 9 is a perspective view of a portion of a robot having multiple modular platforms attached thereto in another configuration.

Referring now to FIGS. 5-9, a robot arm 16A is illustrated with a modular platform 100 connected in various positions and orientations. Other positions, orientations and configurations are contemplated herein. FIG. 5 shows the modular platform 100 connected in a vertical center position 190. FIG. 6 illustrates the modular platform 100 in a vertical bottom position 200. FIG. 7 illustrates the modular platform 100 in a horizontal sideways configuration 210. FIG. 8 illustrates a plurality of modular platforms 100 in a stack arrangement at connection point 220, with a back wall 106 of one modular platform 100 connected to the front wall 102 of another modular platform 100. FIG. 9 illustrates a pair of modular platform 100 stacked parallel on top of another at connection point 230 where a bottom wall 108 of one platform 100 is connected to a top wall 104 of another platform 100. The connection points 220 (FIG. 8) and 230 (FIG. 9) can include any type of mechanical fasteners as would be known to those skilled in the art. Such connections can include, but not limited to, threaded fasteners, clips, press fit features, glue, weld, and braze, just to name a few options.

Figure 10:
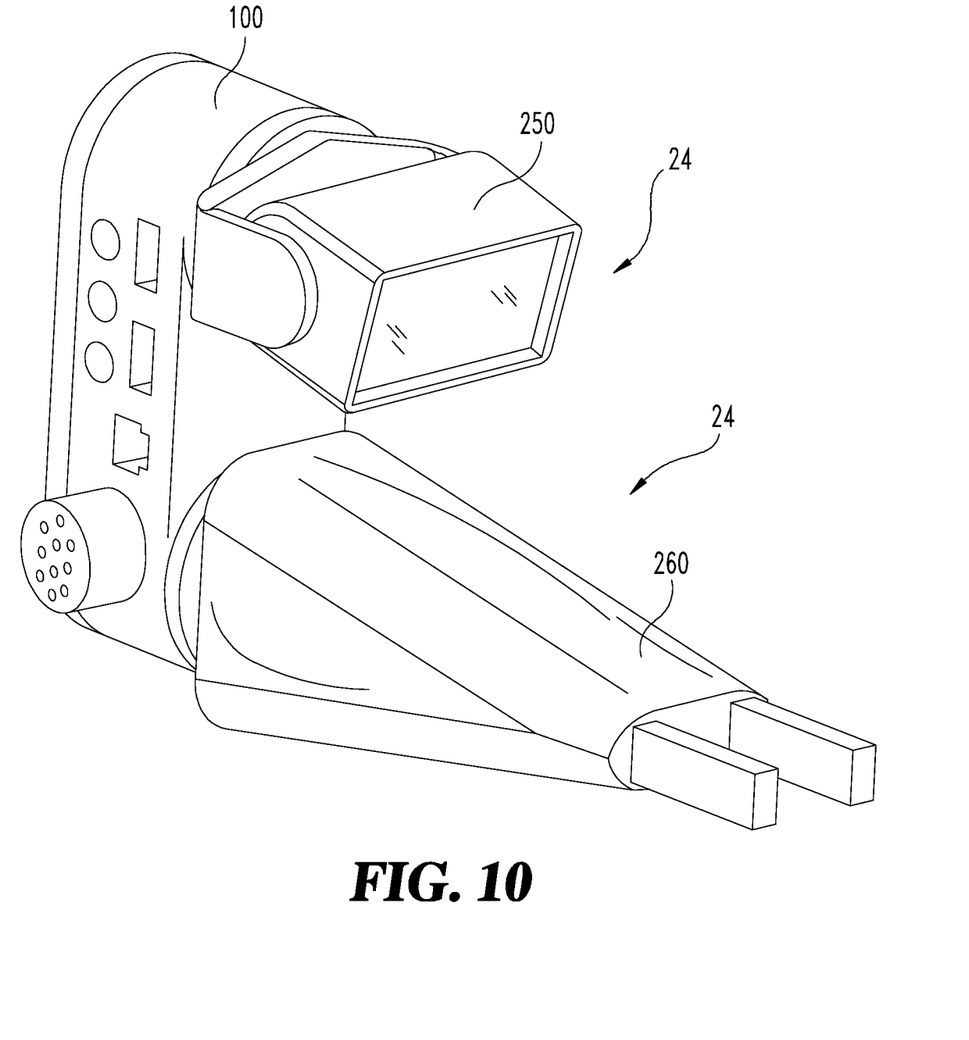
FIG. 10 is a perspective view of the modular platform of FIG. 1 with first and second exemplary end effectors attached thereto.

Referring now to FIG. 10, a perspective view of one embodiment of the modular platform 100 is shown with multiple end effectors 24 coupled thereto. The first end effector can be a sensor 250 connected to one receiving port 110 and a second end effector can be a gripper 260 connected to a second receiving port 110. In some forms the modular platform 100 can include additional receiving ports so as to connect with additional end effectors 24. The types of end effectors 24 are not limited to those disclosed herein, but may include grippers, sensors or other tools configured to perform robot tasks.

In one aspect, the present disclosure includes a modular platform for a robot comprising a first portion connectable to the robot; and a second portion connectable to one or more of a plurality of different robot end effectors.

In refining aspects, the modular platform comprises a fluid input port, a fluid outlet port, an electrical power input port, an electrical power outlet port, a communication input port, a communication output port, wherein the second portion includes a receiving port configured to connect with an end effector, wherein the receiving port includes a threaded aperture or other mechanical connection feature, wherein the end effector includes one or more of a gripper, a sensor, and a tool, wherein the first portion includes two or more mount connectors connectable to the robot and further comprising means for connecting two or more modular platforms together.

Another aspect of the present disclosure includes a method comprising: connecting a modular platform to a robot; and coupling one or more end effectors to the modular platform, wherein the modular platform is configured to couple with a plurality of different end effectors.

In refining aspects, the method includes a plurality of mounting locations formed on the modular platform, wherein the coupling includes transmitting electrical power though the modular platform to each of the one or more end effectors, wherein the coupling includes transmitting communication signals though the modular platform to each of the one or more end effectors and wherein the coupling includes directing a fluid though the modular platform to one or more of the end effectors.

Another aspect of the present disclosure includes a robot system comprising: a robot; a controller operably coupled to the robot; a modular platform having a plurality of mount connectors and a plurality of receiving port connectors; and wherein each of the mount connectors is configured to attach to the robot and each of the receiving ports is configured to connect to an end effector.

In refining aspects, each receiving port includes a threaded aperture, wherein each receiving port includes a fluid port, wherein each receiving port includes an electrical power port, wherein each receiving port includes a communication port, wherein the modular platform includes a connection region configured to couple with another modular platform and wherein two or more modular platforms can be connected together in a parallel orientation and/or in a transverse orientation relative to one another and attached to the robot.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A modular platform for a robot comprising:
   a first portion comprising a first surface, the first surface comprising at least three mount connectors, each mount connector being connectable to the robot; and
   a second portion comprising a second surface that is connectable to one or more of a plurality of different robot end effectors, the second surface including a plurality of receiving ports, each receiving port configured to connect with an end effector and comprising a plurality of fastening apertures structured to receive a plurality of fasteners, the plurality of fastening apertures located radially outward from a fluid port structured to convey a hydraulic fluid, each receiving port further comprising an electrical power port and a communication port,
   wherein the first surface of the first portion of the modular platform is structured to be releasably connectable to a second surface of a second portion of a second modular platform,
   wherein the second surface of the second portion of the modular platform is structured to be releasably connectable to a first surface of a first portion of the second modular platform, and
   wherein each receiving port is configured to be releasably connectable to a mount connector on a plurality of additional modular platforms.

2. The modular platform of claim 1 wherein at least one fluid port is a fluid input port.

3. The modular platform of claim 1 wherein at least one fluid port is a fluid outlet port.

4. The modular platform of claim 1 wherein at least one electrical power port is an electrical power input port located radially inward from the plurality of fastening apertures of at least one of the receiving ports.

5. The modular platform of claim 1 wherein at least one electrical power port is an electrical power outlet port located radially inward from the plurality of fastening apertures of at least one of the receiving ports.

6. The modular platform of claim 1 wherein at least one communication port is a communication input port located radially inward from the plurality of fastening apertures of at least one of the receiving ports.

7. The modular platform of claim 1 wherein at least one communication port is a communication output port located radially inward from the plurality of fastening apertures of at least one of the receiving ports.

8. The modular platform of claim 1, wherein the plurality of fastening apertures are threaded apertures.

9. The modular platform of claim 1, wherein each connected end effector includes one or more of a gripper, a sensor, and a tool.

10. The modular platform of claim 1 further comprising means for connecting two or more modular platforms together.

11. The modular platform of claim 1 further comprising an electrical power port located radially inward from the plurality of fastening apertures and a communication port located radially inward from the plurality of fastening apertures.

12. The modular platform of claim 1, which further includes a modular housing having the first portion and the second portion, wherein the first portion is opposite the second portion, and wherein the modular housing includes a housing side fluid port structured to be in fluid communication with the fluid port during operation of the end effector, the housing also including at least one of a housing side communication port and a housing side electrical power port.

13. The modular platform of claim 1 wherein the first surface of the first portion of the modular platform is structured to be releasably connectable to both the second surface of the second portion of the second modular platform and a second surface of a second portion of a third modular platform at the same time, and
   wherein the second surface of the second portion of the modular platform is structured to be releasably connectable to both the first surface of the first portion of the second modular platform and a first surface of a first portion of the third modular platform at the same time.

14. A method comprising:
   connecting a modular platform to a robot assembly, the modular platform comprising a front side and a backside, the front side having at least three mounting locations, each mounting location being connectable to a robot, the backside disposed opposite the front side and having at least two receiving ports, each receiving port configured to be releasably connectable to a mounting location on a plurality of additional modular platforms and including a plurality of fastening apertures structured to receive a plurality of fasteners, the plurality of fastening apertures located radially outward from a fluid port structured to convey a hydraulic fluid; and coupling one or more end effectors to the modular platform, wherein the modular platform is configured to couple with a plurality of different end effectors, wherein the connecting includes connecting a second modular platform to a robot to form the robot assembly where the backside of the modular platform is connected to a front side of the second modular platform, the front side of the second modular platform having at least two second receiving ports, each second receiving port including a second plurality of fastening apertures structured to receive a second plurality of fasteners, each second plurality of fastening apertures also located radially outward from a second fluid port structured to convey the hydraulic fluid.

15. The method of claim 14, wherein the coupling includes transmitting electrical power via an electrical conduit though the modular platform to each of the one or more end effectors, wherein the electrical conduit is located radially inward of the plurality of fastening apertures.

16. The method of claim 14, wherein the coupling includes transmitting communication signals though the fluid port of the modular platform to each of the one or more end effectors.

17. The method of claim 14, wherein the coupling includes directing the hydraulic fluid though the modular platform to one or more of the end effectors.

18. A robot system comprising:
a robot;
a controller operably coupled to the robot;
a modular platform having a first surface comprising at least three mount connectors and a second surface disposed opposite the first surface and comprising a plurality of receiving ports; and
wherein each of the mount connectors is configured to attach to the robot and each of the receiving ports is configured to connect to an end effector;

wherein each of the plurality of receiving ports is configured to be releasably connectable to a mount connector on a plurality of additional modular platforms and includes a plurality of fastening apertures structured to receive a plurality of fasteners, the plurality of fastening apertures located radially outward from a fluid port located in the receiving port and structured to convey a hydraulic fluid, each receiving port further comprising an electrical power port and a communication port; and wherein the first surface of the modular platform is structured to be releasably connectable to a second surface of a second modular platform, and wherein the second surface of the modular platform is structured to be releasably connectable to a first surface of the second modular platform.

19. The robot system of claim 18, wherein the plurality of fastening apertures are threaded apertures.

20. The robot system of claim 18, wherein each receiving port includes an electrical power port located radially inward from the plurality of fastening apertures.

21. The robot system of claim 18, wherein each receiving port includes a communication port located radially inward from the plurality of fastening apertures.

22. The robot system of claim 18, wherein the modular platform includes a connection region configured to couple with another modular platform.

23. The robot system of claim 22, wherein two or more modular platforms can be connected together in a parallel orientation and/or in a transverse orientation relative to one another and attached to the robot.

24. The robot system of claim 18, wherein each receiving port includes an electrical power port located radially inward from the plurality of fastening apertures and a communication port located radially inward from the plurality of fastening apertures.

* * * * *